(12) United States Patent
Von Handorf et al.

(10) Patent No.: US 9,822,498 B2
(45) Date of Patent: Nov. 21, 2017

(54) PRECAST CONCRETE BRIDGE UNIT AND HEADWALL ASSEMBLY AND METHOD OF PRODUCTION

(71) Applicant: Structure Sight LLC, Dayton, OH (US)

(72) Inventors: Jeffrey J. Von Handorf, Waynesville, OH (US); Tommy E. Nicholson, Bellbrook, OH (US)

(73) Assignee: Structure Sight LLC, Dayton, OH (US)

( * ) Notice: Subject to any disclaimer, the term of this patent is extended or adjusted under 35 U.S.C. 154(b) by 0 days.

(21) Appl. No.: 15/226,978

(22) Filed: Aug. 3, 2016

(65) Prior Publication Data

US 2016/0376755 A1    Dec. 29, 2016

Related U.S. Application Data

(63) Continuation-in-part of application No. 14/751,540, filed on Jun. 26, 2015.

(51) Int. Cl.
| | |
|---|---|
| *E01D 4/00* | (2006.01) |
| *E01D 19/00* | (2006.01) |
| *E01F 5/00* | (2006.01) |
| *B29C 39/10* | (2006.01) |
| *E01D 21/00* | (2006.01) |
| *E01D 101/26* | (2006.01) |

(52) U.S. Cl.
CPC ............ *E01D 19/005* (2013.01); *B29C 39/10* (2013.01); *E01D 4/00* (2013.01); *E01D 21/00* (2013.01); *E01F 5/005* (2013.01); *E01D 2101/26* (2013.01)

(58) Field of Classification Search
CPC ......... E01D 19/005; E01D 4/00; E01D 21/00; E01D 2101/26; B29C 39/10; E01F 5/005
USPC ................................ 14/24, 26; 405/125, 126
See application file for complete search history.

(56) References Cited

U.S. PATENT DOCUMENTS

| | | | | |
|---|---|---|---|---|
| 786,059 | A * | 3/1905 | Simpson | E01F 5/005 405/125 |
| 818,272 | A * | 4/1906 | Moats | E01F 5/005 138/153 |
| 832,017 | A * | 9/1906 | Hummel | E01F 5/005 405/126 |
| 915,266 | A * | 3/1909 | Boyd | E01F 5/005 235/24 |

(Continued)

OTHER PUBLICATIONS

Butler, Patrick Neal; Office Action; U.S. Appl. No. 14/751,540; dated Jul. 7, 2017; U.S. Patent and Trademark Office; Alexandria, VA.

*Primary Examiner* — Raymond W Addie
(74) *Attorney, Agent, or Firm* — Stevens & Showalter, LLP

(57) ABSTRACT

A precast concrete bridge and headwall assembly includes a precast concrete bridge unit including a top wall connecting opposite side walls, and a precast concrete headwall having a bottom surface engaged on the top wall of the bridge unit and a series of earth anchors at laterally spaced intervals between the side walls. The earth anchors include a body member extending outward from the headwall to the top wall, and a foot member extending laterally outward from the body member engaged on the top wall and including an upper surface generally parallel to the top wall.

12 Claims, 12 Drawing Sheets

(56) References Cited

U.S. PATENT DOCUMENTS

| | | | |
|---|---|---|---|
| 950,928 A * | 3/1910 | Lana | E01F 5/005 405/125 |
| 1,228,662 A * | 6/1917 | Good | E01F 5/005 405/125 |
| 1,412,616 A | 4/1922 | Kammerer | |
| 1,664,503 A * | 4/1928 | Cornell | E01F 5/005 405/125 |
| 1,997,236 A * | 4/1935 | Schroeder, Jr. | E01F 5/005 138/158 |
| 2,041,267 A * | 5/1936 | Schroeder, Jr. | E01F 5/005 405/125 |
| 4,390,306 A | 6/1983 | Fisher | |
| 4,459,063 A | 7/1984 | Shaw | |
| 4,537,529 A * | 8/1985 | FitzSimons | E01D 4/00 405/124 |
| 4,563,107 A | 1/1986 | Peterson | |
| 4,587,684 A | 5/1986 | Miller | |
| 4,993,872 A * | 2/1991 | Lockwood | E01F 5/005 405/125 |
| 5,536,113 A * | 7/1996 | McGregor | E02D 29/045 405/125 |
| 6,205,605 B1 | 3/2001 | Orsat | |
| 6,922,650 B2 * | 7/2005 | Sato | G01R 31/31917 324/762.01 |
| 6,922,950 B2 * | 8/2005 | Heierli | E02D 29/05 405/124 |
| 7,556,451 B2 | 7/2009 | Beach et al. | |
| 8,496,405 B1 * | 7/2013 | Kincheloe | E03F 5/0404 210/163 |
| 2002/0076280 A1 * | 6/2002 | Semotiuk | E01F 5/005 405/124 |
| 2005/0214075 A1 | 9/2005 | Reedijk | |
| 2005/0241263 A1 | 11/2005 | Van Rijn | |
| 2007/0059102 A1 | 3/2007 | Beach | |
| 2014/0241805 A1 * | 8/2014 | Aston | B28B 7/02 405/124 |

* cited by examiner

PRECAST CONCRETE BRIDGE UNIT AND HEADWALL ASSEMBLY AND METHOD OF PRODUCTION

CROSS-REFERENCE TO RELATED APPLICATIONS

This application is a continuation-in-part of and claims priority to U.S. patent application Ser. No. 14/751,540, filed Jun. 26, 2015, which application is herein incorporated by reference in its entirety as if fully set forth herein.

FIELD OF THE INVENTION

This invention is directed to precast structures, and more particularly to an improved precast concrete bridge unit and headwall assembly.

BACKGROUND OF THE INVENTION

In a precast reinforced concrete bridge unit having a headwall it is known to cast the headwall as an integral part of an end bridge unit when the bridge unit is being cast. It is also known to precast the headwall separately with a bottom arcuate abutment or collar which extends continuously across the arcuate top wall of the bridge unit. The collar is secured to the top wall of the bridge unit by bolts or threaded rods which extend into the top wall and are threaded into concrete anchors embedded within the top wall. The continuous arcuate collar provides for attaching the vertical headwall to the bridge unit at the construction site. It is also known to precast a series of concrete counterfort members that are supported on a headwall and subsequently secured to the top wall of the bridge unit by bolts or threaded rods which extend into the top wall and are threaded into concrete anchors embedded within the top wall.

It is desirable for the headwall to be precast separately from the precast bridge unit for significantly reducing the weight of the precast bridge unit and to facilitate shipping the precast bridge unit along a roadway or highway with a semi-truck and low bed trader vehicle. The separate precast headwall units also facilitate handling and shipping of the headwall units on a semi-truck and trailer vehicle. After all of the bridge units are positioned at the construction site with the aid of a crane, the headwall units are then positioned with the crane and attached to the opposite end bridge units.

SUMMARY OF THE INVENTION

In accordance with an aspect of the invention, a method of producing a precast concrete bridge and headwall assembly is provided, comprising the steps of: casting a reinforced concrete bridge unit having a top wall connecting opposite side walls; positioning the bridge unit with a first side supported by a horizontal casting surface, wherein the top wall is positioned adjacent a framing unit for the headwall; forming a precast concrete headwall on the casting surface adjacent the top wall with a series of earth anchors at laterally spaced intervals along the top wall between the side walls, each earth anchor formed with: a) a body member extending outward from the headwall to the top wall; and b) a foot member extending laterally outward from the body member engaged on the top wall and including an upper surface generally parallel to the top wall; and removing the headwall and earth anchors as a unit from the bridge unit.

A series of earth anchor forms may be releasably attached to the top wall of the bridge unit at laterally spaced intervals between the side walls prior to forming the precast concrete headwall, wherein a bottom edge of the earth anchor forms is located adjacent the framing unit.

The earth anchors may be precast simultaneous with precasting of the headwall, forming an integral unit made up of the earth anchors and the headwall.

The earth anchors may be precast into the earth anchor forms before the headwall has completely hardened.

The earth anchors may be formed without passages in the body member defining connection points to the top wall.

The body member may have opposing lateral sides and the foot member may include lateral foot sections that extend laterally outward from each of the lateral sides of the body member.

The foot member may include a distal foot section defining a surface that extends from the body member, distal from the headwall, and between the lateral foot sections.

In accordance with another aspect of the invention, a precast concrete bridge and headwall assembly is provided comprising a precast concrete bridge unit including a top wall connecting opposite side walls, and a precast concrete headwall having a bottom surface engaged on the top wall of the bridge unit and a series of earth anchors at laterally spaced intervals between the side walls. The earth anchors comprise: a) a body member extending outward from the headwall to the top wall; and b) a foot member extending laterally outward from the body member engaged on the top wall and including an upper surface generally parallel to the top wall.

The earth anchors may be positioned in contact with the top wall to effect a frictional engagement at an interface between each earth anchor and the top wall.

The interface formed between each earth anchor and the top wall may be formed without a connecting structure extending across the interface between the earth anchors and the top wall.

The body member may have opposing lateral sides and the foot member may include lateral foot sections that extend laterally outward from each of the lateral sides of the body member.

The foot member may include a distal foot section defining a surface that extends from the body member, distal from the headwall, and between the lateral foot sections.

A layer of soil may cover the foot member to effect a weight on the earth anchor retaining the headwall in a vertical position on the top wall.

The body member may be defined by a planar member and the foot member may be defined by a planar member, the body member extending perpendicular to the foot member.

The earth anchors may be integrally formed with the headwall such that no seam is present between the headwall and the earth anchors.

In accordance with a further aspect of the invention, a precast concrete bridge and headwall assembly is provided comprising a precast concrete bridge unit including a top wall connecting opposite side walls, and a precast concrete headwall having a bottom surface engaged on the top wall of the bridge unit and a series of earth anchors at laterally spaced intervals between the side walls. The earth anchors comprise: a) a body member extending outward from the headwall to the top wall; and b) a foot member extending laterally outward from the body member engaged on the top wall and including an upper surface generally parallel to the top wall. The earth anchors are integrally formed with the headwall such that no seam is present between the headwall and the earth anchors.

The body member may be defined by a planar member and the foot member may be defined by a planar member, the body member extending perpendicular to the foot member.

The body member may have opposing lateral sides and the foot member may include lateral foot sections that extend laterally outward from each of the lateral sides of the body member and the foot member may include a distal foot section defining a surface that extends from the body member, distal from the headwall, and between the lateral foot sections.

The earth anchor may define a cross-section having an inverted T-shape.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
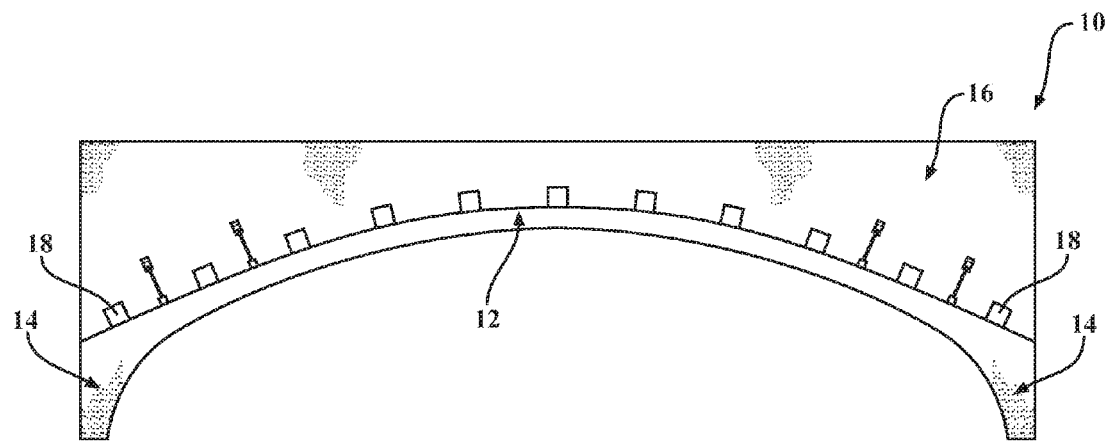
FIG. 1 is an end view of an assembly of a precast concrete bridge unit and headwall unit constructed and assembled in accordance with the invention.

A method of production of a precast bridge unit and headwall assembly will be described. Referring to FIG. 1, a precast reinforced concrete culvert or bridge unit 10 is constructed. The bridge unit 10 includes a top wall 12, which may have a conventional arcuate configuration, see FIG. 1, or which may have a flat construction, and which integrally connects parallel spaced vertical side walls 14 to form an open bottom bridge unit. However, a bridge unit may also be constructed with a bottom wall which also integrally connects the side walls 14 to form a box-type culvert or bridge unit. A separately precast steel reinforced flat concrete headwall 16 projects upwardly from one end of the bridge unit 10 and is supported by a plurality or series of concrete buttresses or counterfort members 18 which preferably are tapered in two directions. For purposes of simplification, each of the counterfort members 18 is illustrated as being identical. However, the counterfort members 18 may be of different sizes, for example, two different sizes, and larger counterfort members may be used on opposite end portions of the headwall 16, as is discussed in detail below.

Figure 2:
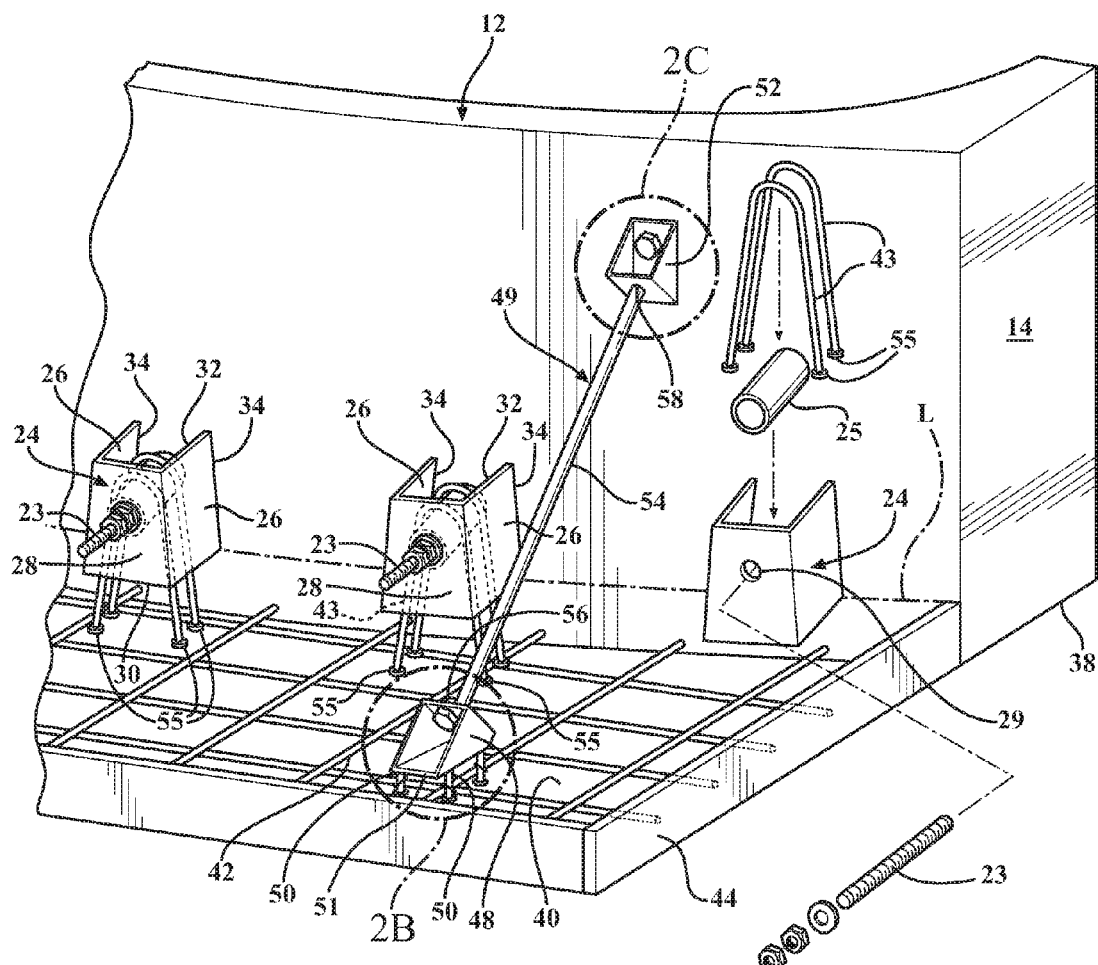
FIG. 2 is a partial perspective view of the bridge unit and casting framework including releasably attached counterfort forms before concrete has been poured.
Figures 2A, 2B:
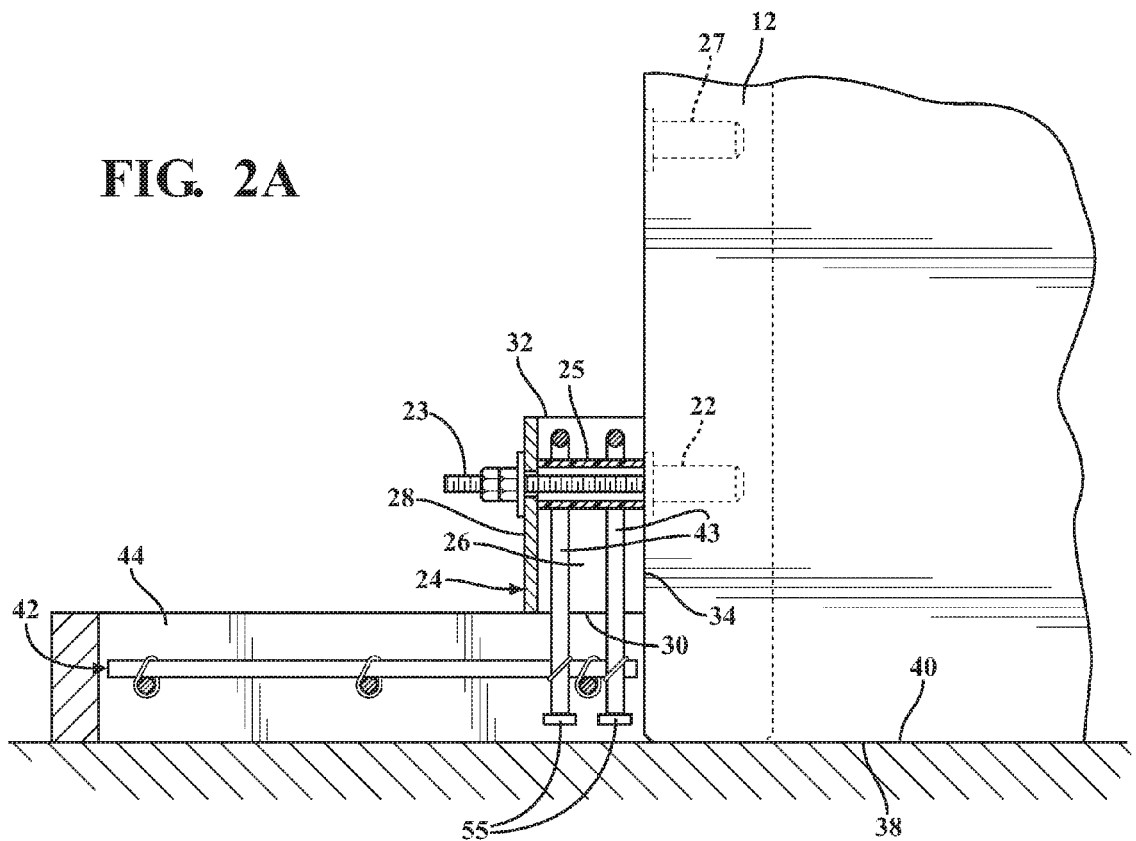
FIG. 2A is a cross-sectional view taken through a counterfort form and the casting framework and framing unit of FIG. 2.
FIG. 2B is a cross-sectional view taken through a primary bracket in FIG. 2.

As shown in FIGS. 2 and 2A, when the bridge unit 10 is precast, the arcuate top wall 12 is provided with a series of laterally spaced tubular steel first anchor members 22 having internal threads and an end cap or plate, and may further include at least one second anchor member 27 (FIG. 2A) for supporting an anchor bracket. The laterally spaced embedded first anchor members 22 and the at least one second anchor member 27 are located a predetermined distance from a first side 38 of the bridge unit 10. The anchor members 22 are configured to receive a threaded shaft 23, i.e., a bolt or rod, passing through and supporting a tubular member 25, as is discussed further below.

Referring to FIG. 2, after the top wall 12 and side walls 14 of the bridge unit 10 are precast, a series of counterfort forms 24 are releasably attached to the top wall 12 at laterally spaced intervals between the side walls 14. The counterfort forms 24 may be formed as a sheet metal structure for defining a predetermined counterfort shape. Each counterfort form 24 has two side plates 26, a lateral plate 28 between the side plates 26, a bottom edge 30, a top edge 32, and forward edges 34. The lateral plate 28 includes an aperture 29 for passage of the threaded shaft 23. The counterfort forms 24 are assembled to the top bridge unit 10 such that the forward edges 34 are adjacent the top wall 12 of the bridge unit 10, the lateral plate 28 is spaced from the top wall 12 of the bridge unit 10, and the bottom edge 30 is spaced from a horizontal casting surface 40 supporting the first side of the bridge unit 10. The counterfort forms 24 are each held in position on the bridge unit 10 by one of the threaded shafts 23 extending through the aperture 29 and secured, for example, by two nuts and a washer. In a typical construction, the tubular member 25 may comprise a section of PVC pipe that is positioned within the counterfort form 24 when the counterfort form 24 is assembled to the bridge unit 10 prior to a casting operation. The counterfort form 24 isolates the threaded shaft 23 from concrete formed in the counterfort form 24.

As shown in FIG. 2, the bridge unit 10 is illustrated positioned with a first side 38 supported by the horizontal casting surface 40 and a casting framework 42 is constructed above the casting surface 40 adjacent the top wall. The bottom edge 30 of the counterfort forms 24 is located adjacent an upper edge of the casting framework 42, identified by the dashed line L, with the bottom edge 30 vertically aligned with an intended location of an upper surface of the headwall 16 during a casting operation. The casting framework 42 may be formed of, for example, rebar. Rebar reinforcements 43 may be placed in each of the counterfort forms 24 such that a portion of the rebar reinforcement 43 extends down into the casting framework 42. For example, one or more rebar reinforcements 43 may be formed as a U-shaped member extending around the outside of the tubular member 25. The rebar reinforcements 43 may include enlarged ends 55 for increased anchoring and reinforcement strength. A framing unit 44 is placed on the casting surface 40 to define the top end surface and side edge surfaces of the headwall 16.

Figure 2C:
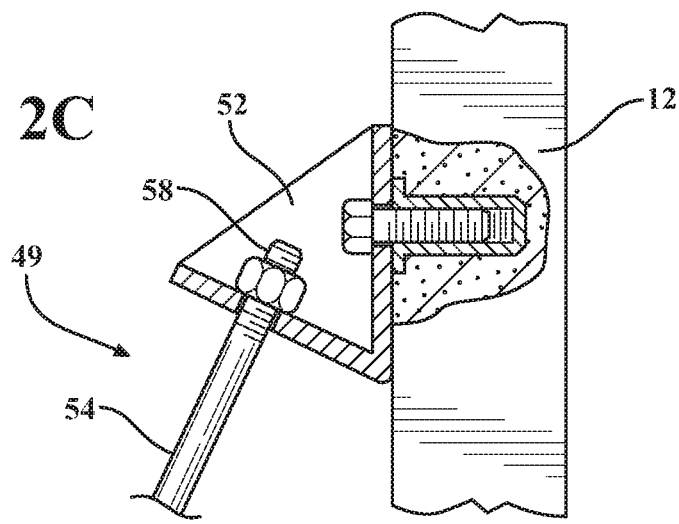
FIG. 2C is a cross-sectional view taken through a secondary bracket in FIG. 2.

Referring additionally to FIGS. 2B and 2C, one or more bracing structures 49 are provided located laterally between adjacent counterfort forms 24. The bracing structure 49 can comprise a primary bracket 48 located adjacent the casting framework 42, a secondary bracket 52 releasably attached to the top wall 12 of the bridge unit 10 via a bolt engaged with the at least one second anchor member 27, and a brace member 54 extending between the primary and secondary brackets 48, 52. The brace member 54 may comprise a rod having opposite threaded first and second ends 56, 58 for detachably coupling to the primary and secondary brackets 48, 52 via nuts applied to the ends 56, 58. The primary bracket 48 may include a base portion 51 having a plurality of studs 50, such as four studs 50, extending downward into the casting framework 42. The studs 50 preferably comprise Nelson studs for anchoring in the concrete forming the headwall 16.

Prior to formation of the headwall 16, the primary bracket 48 may be supported by attachment of one or more of the studs 50 to the casting framework 42, such as by tying the studs 50 via wire to the casting framework 42. The releasable coupling of the brace member 54 to the primary and secondary brackets 48, 52 forms a detachable assembly that permits the bracing structure 49 to be located in position during formation of the headwall 16 for accurate placement of the primary bracket 48, and allowing disassembly for shipment of the bridge unit 10 and the headwall 16 as separate components. It may be noted that the bracing structure 49 is preferably formed of a corrosion resistant material, such as stainless steel.

Figure 3:
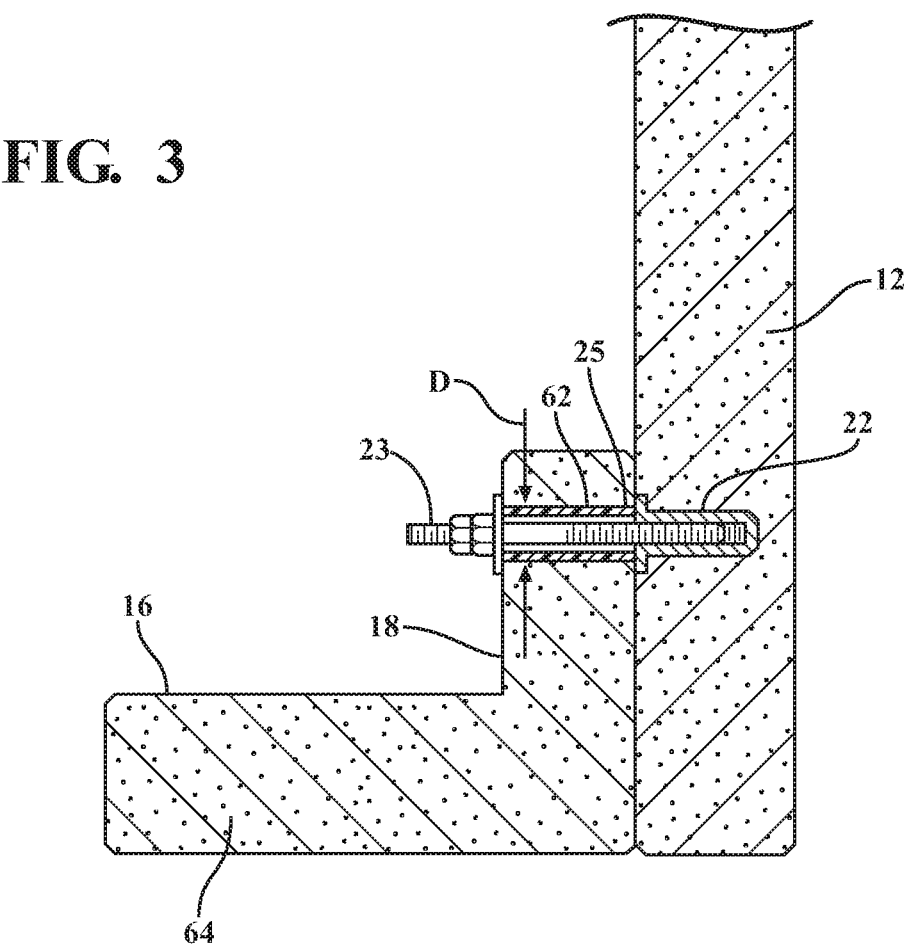
FIG. 3 is a fragmentary cross-sectional view of the bridge unit and headwall and counterfort unit releasably attached to the bridge unit after the concrete has hardened.

With the counterfort forms 24, the brace assembly 49 and the framing unit 44 in position with the top wall 10, concrete is poured into the framing unit 44 and around the brace assembly 49 to form the headwall 16. Subsequently, before the concrete of the headwall 16 fully sets, concrete is poured in the counterfort forms 24. Hence, the top wall 12 with a counterfort form 24 forms a mold cavity for formation of a counterfort member 18. The concrete for the counterfort members 18 can be poured simultaneous with or as a final stage of pouring of the concrete for the headwall 16, i.e., immediately following the pouring of the concrete of the headwall 16 while the headwall concrete is still wet. Forming the counterfort members 18 simultaneously with, or substantially simultaneously with, the formation of the headwall 16 is designed to create the counterfort members 18 as integral or unitary with the concrete material of the headwall 16, defining an integral unit 64, as illustrated in FIG. 3. The construction of the integral unit 64 avoids formation of a seam along the junction between the counterfort members 18 and the headwall 16. By providing a continuous or seamless junction between the counterfort members 18 and the headwall 16, the reinforcements 43 are located fully surrounded by concrete material without a pathway for moisture to penetrate from exterior of the counterfort member 18 to the reinforcements 43. Hence, deterioration caused by oxidation (rust) of the reinforcements 43 can be avoided by the integral construction described herein.

Further, upon hardening of the concrete forming the headwall 16, the at least one primary bracket 48, previously positioned at least partially within the casting framework 42, is integrally formed with the headwall 16 via the studs 50, i.e., the studs 50 are embedded within the hardened concrete of the headwall 16. A cross-hole 62 is created in each of the counterfort members 18 by way of the threaded shaft 23 and the tubular member 25 such that a diameter D of the cross-hole 62 generally corresponds to the diameter of the tubular member 25, see FIG. 3. After the concrete forming the headwall 16 and counterfort members 18 is set or hardened, the series of counterfort forms 24 can be removed from the top wall 12 of the bridge unit 10, and the first and second ends 56, 58 of the brace member 54 can be disconnected for separation of the headwall from the bridge unit 10. It may be noted that the removed counterfort forms 24 may be reused in subsequent processes to create additional integral units 64.

Subsequently, the bridge units 10 and integral units 64 can be shipped to a construction site where opposite end bridge units 10 may be installed with a crane on supporting concrete footers, and the integral units 64 can be attached to the top wall 12 of each bridge unit 10 with the threaded shafts 23 to form a bridge unit and headwall assembly. After all of the bridge units and integral units 64 are backfilled with compacted soil, the soil around the attached counterfort members 18 cooperates to provide for a more positive lock of the integral units 64 to the end bridge units 10.

Figure 4:
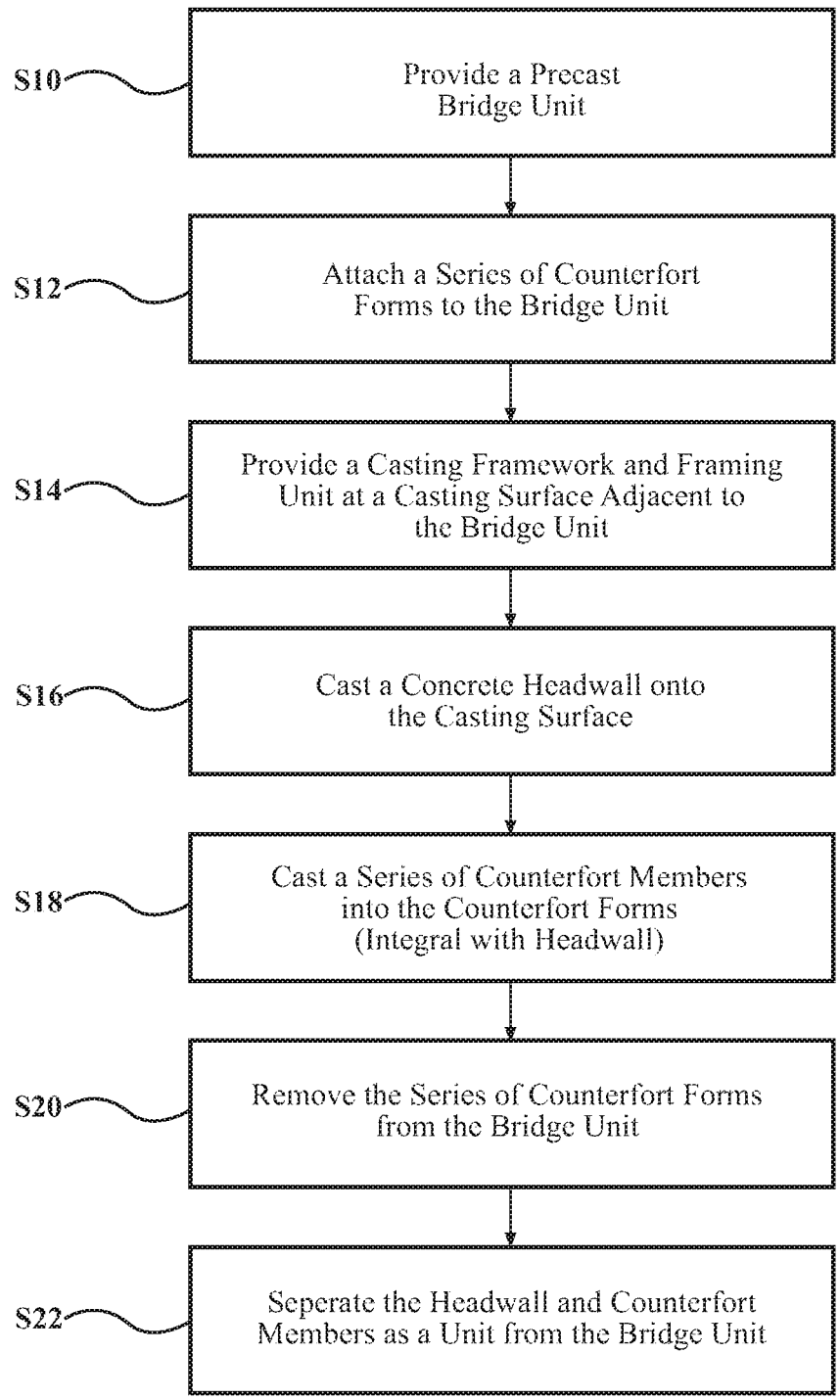
FIG. 4 is a flow chart illustrating the steps in the method of producing a precast concrete bridge and headwall assembly.

Summarizing the process for formation of the integral units 64, with reference to FIG. 4: a precast bridge unit is initially provided at step S10, a series of counterfort forms are attached to the bridge unit at step S12; a casting framework and framing unit are provided at the casting surface adjacent to the bridge unit at step S14; concrete is provided to cast the headwall on the casting surface at step S16; concrete is provide to the series of counterfort forms before the concrete of the headwall has completely hardened at step S18; the counterfort forms are then detached from the bridge unit after the concrete has hardened at step S20; and the integral unit of the headwall and counterfort members is then separated from the bridge unit at step S22.

Figure 5:
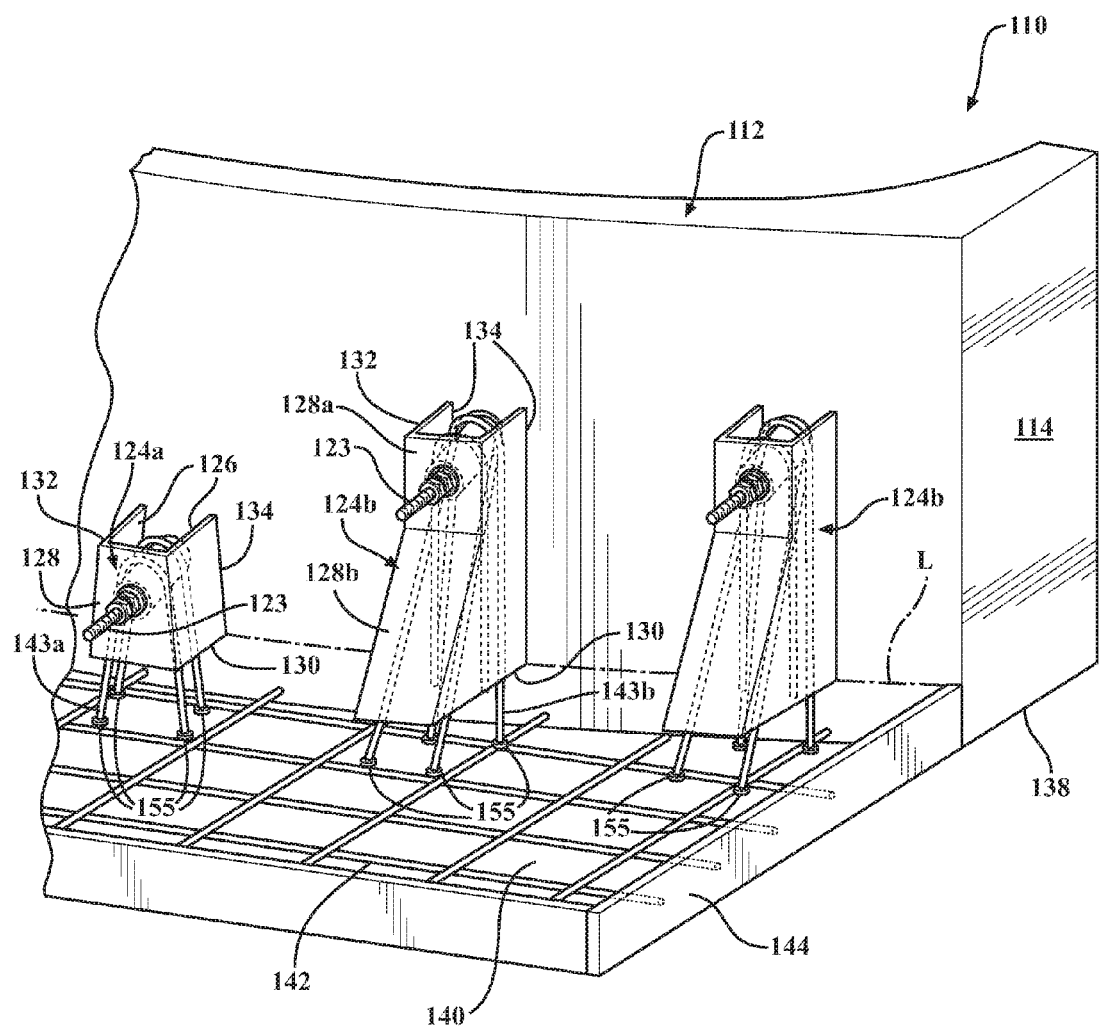
FIG. 5 is a partial perspective view of the bridge unit and casting framework including releasably attached counterfort forms in two different sizes before concrete has been poured.
Figure 5A:
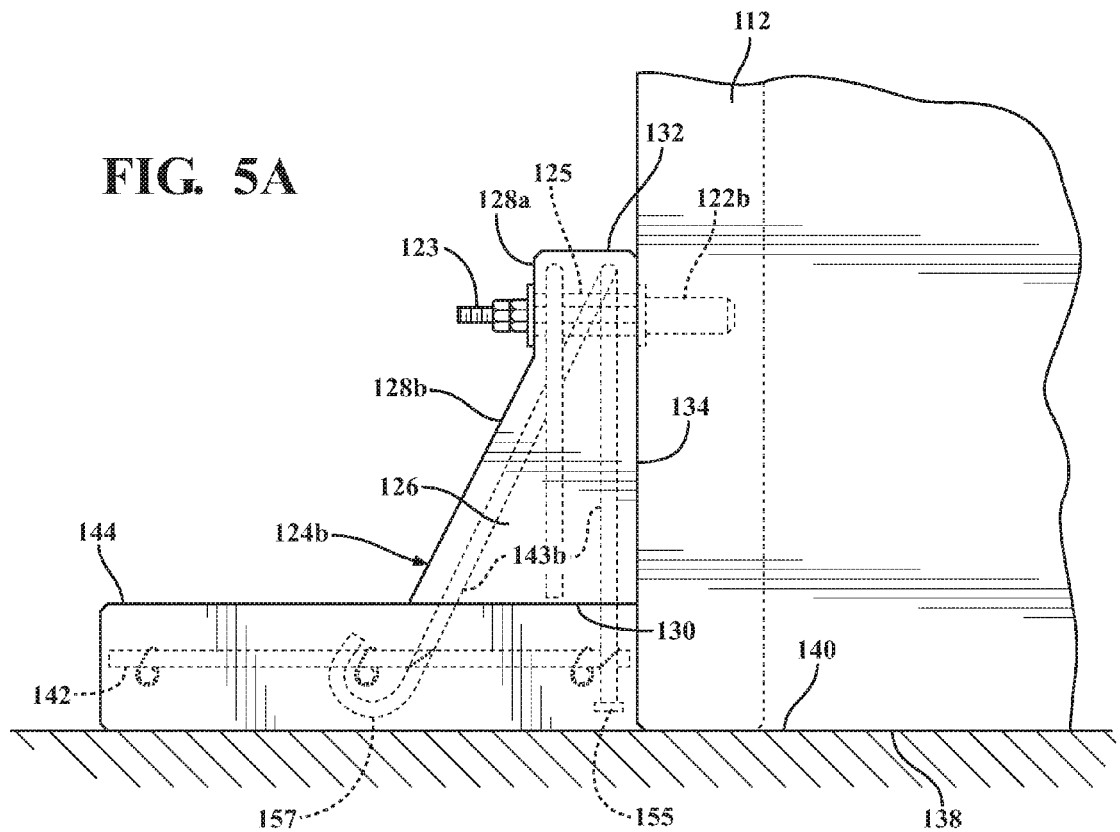
FIG. 5A is a side view of the structure illustrated in FIG. 5.
Figure 6:
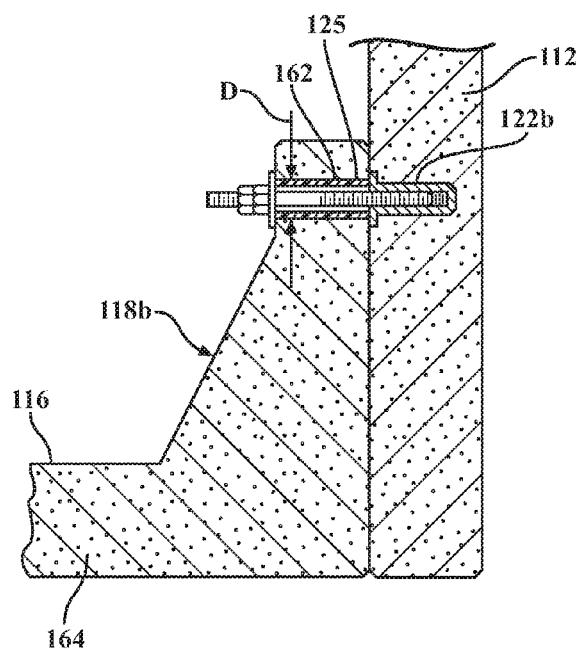
FIG. 6 is a fragmentary cross-sectional view of the bridge unit and headwall and a counterfort unit having a second size releasably attached to the bridge unit after the concrete has hardened.

Referring to FIGS. 5, 5A and 6, an alternative configuration of the bridge unit and headwall assembly will be described wherein structure corresponding to that described above with reference to FIGS. 1-4 is identified with the same reference number increased by 100.

Referring to FIG. 5, a precast reinforced concrete culvert or bridge unit 110 is constructed. The bridge unit 110 includes a top wall 112, which may have a conventional arcuate construction, as shown in FIG. 5, or which may have a flat construction, and which integrally connects parallel spaced vertical side walls 114 to form a bridge unit. A separately precast steel reinforced flat concrete headwall 116 projects upwardly from one end of the bridge unit 110 and is supported by a plurality or series of concrete buttresses or counterfort members 118, 118*b*. The counterfort members 118, 118*b* may be of different sizes, for example, two different sizes, and larger counterfort members may be used on opposite end portions of the headwall 116, discussed in detail below.

As shown in FIGS. 5 and 5A, when the bridge unit 110 is precast, the arcuate top wall 112 is provided with a series of first and second laterally spaced tubular steel anchor members 122, 122*b* having internal threads and an end cap or plate. The first laterally spaced embedded anchor members 122 are located a first predetermined distance from a first side 138 of the bridge unit 110. The second laterally spaced embedded anchor members 122*b* are located a second predetermined distance from a first side 138 of the bridge unit 110. A threaded shaft 123 can be anchored within each of the anchor members 122, 122*b* extending outward from the top wall 112. A tubular member 125 may be positioned over each threaded shaft 123.

After the bridge unit 110 is precast, a series of counterfort forms 124*a*, 124*b* are releasably attached to the top wall 112 at laterally spaced intervals between the side walls 114. Each counterfort form 124*a* may be formed the same as the previously described counterfort form 24, and includes two side plates 126, a lateral plate 128 between the side plates 126, a bottom edge 130, a top edge 132, and forward edges 134. Each counterfort form 124*b* has two side plates 126, a first lateral plate 128*a* having an aperture 129, a second lateral plate 128*b*, the first and second lateral plates 128*a*, 128*b* being between the side plates 126, a bottom edge 130, a top edge 132, and forward edges 134. The first lateral plate 128*a* extends generally parallel to the top wall 112 of the bridge unit 110 and the second lateral plate 128*b* angles away from the first lateral plate 128*b* and top wall 112 toward a horizontal casting surface 140. The second counterfort form 124*b* is taller along the top wall 112 and extends a greater distance from the top wall 112 than the first counterfort form 124*a*. The counterfort forms 124*a*, 124*b* are positioned such that the forward edges 134 are adjacent the top wall 112 of the bridge unit 110, the lateral plates 128, 128*a*, 128*b* are spaced from the top wall 112 of the bridge unit 110, and one of the threaded shafts 123 extends through each aperture 129, and is secured, for example, by two nuts and a washer, to support the counterfort forms 124*a*, 124*b* to the bridge unit 110.

The bridge unit 110 is initially provided positioned with a first side 138 supported by the horizontal casting surface 140 and the top wall 112 being adjacent a casting framework 142 and a framing unit 144. The bottom edge 130 of the counterfort forms 124*a*, 124*b* is located adjacent an upper edge of the casting framework 142, identified by the dashed line L, and framing unit 144. The casting framework 142 may be formed of, for example, rebar. Rebar reinforcements 143*a*, 143*b* may be placed in the respective counterfort forms 124*a*, 124*b* such that a portion of the rebar reinforcement 143*a*, 143*b* extends down into the casting framework 142. The rebar reinforcements 143*a*, 143*b* may include enlarged ends 155, or hooks, as illustrated for example by hook 157 in FIG. 5A, and any combination thereof, for increased anchoring and reinforcement strength. The framing unit 144 is placed on the casting surface 140 to define the top end surface and side edge surfaces of the headwall 116.

Figure 7:
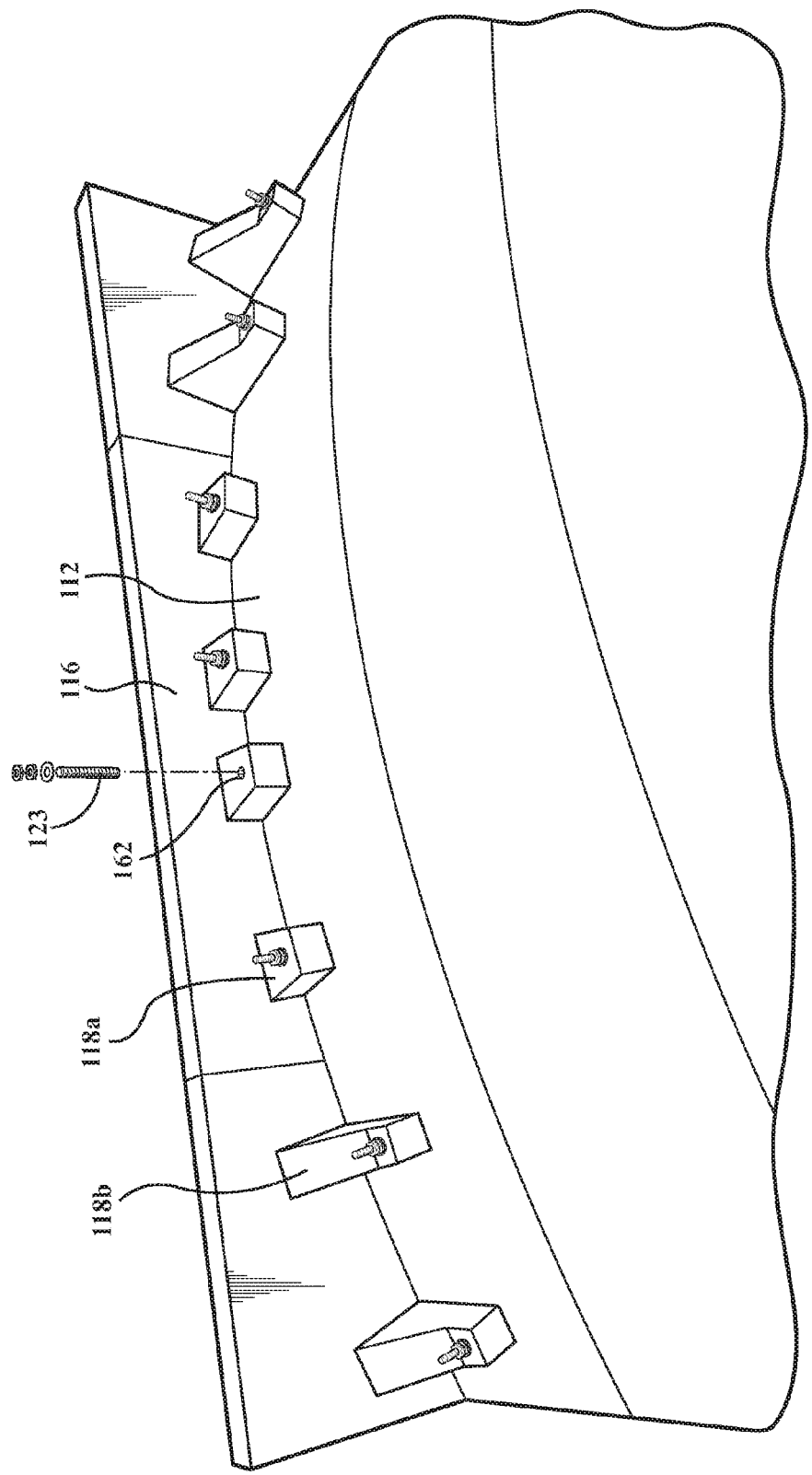
FIG. 7 is a perspective view of the bridge unit and headwall assembly including two different size counterforts.

The concrete headwall 116 is cast on the casting surface 140 embedding the casting framework 142 within the headwall 116. Before the headwall 116 completely hardens, the counterfort members 118*a*, 118*b* are cast into the counterfort forms 124, 124*b*, as seen in FIGS. 6 and 7 and as described above with reference to the formation of the counterfort members 18. A cross-hole 162 is created in each of the counterfort members 118, 118*b* by way of the threaded shaft 123 and the tubular member 125 such that a diameter D of the cross-hole 162 generally corresponds to the diameter of the tubular member 125, see FIG. 6. After the concrete forming the headwall 116 and counterfort members 118*a*, 118*b* sets or hardens, an integral unit 164, made up of the counterfort members 118*a*, 118*b* and the headwall 116, is formed such that no seam is present between the headwall 116 and the counterfort members 118*a*, 118*b*, as illustrated in FIG. 6. While two different size counterfort members 118, 118*b* are shown in FIG. 6, it is understood that more than two different sizes may be used, for example, three or four different sizes. Subsequent to hardening of the material of the integral unit 164, the series of counterfort forms 124*a*, 124*b* is removed from the top wall 112 of the bridge unit 110. The integral unit 164 is then separated from the bridge unit 110 for shipment to a construction site where the integral unit 164 and bridge unit 110 may be assembled to form a bridge unit and headwall assembly.

Figure 8:
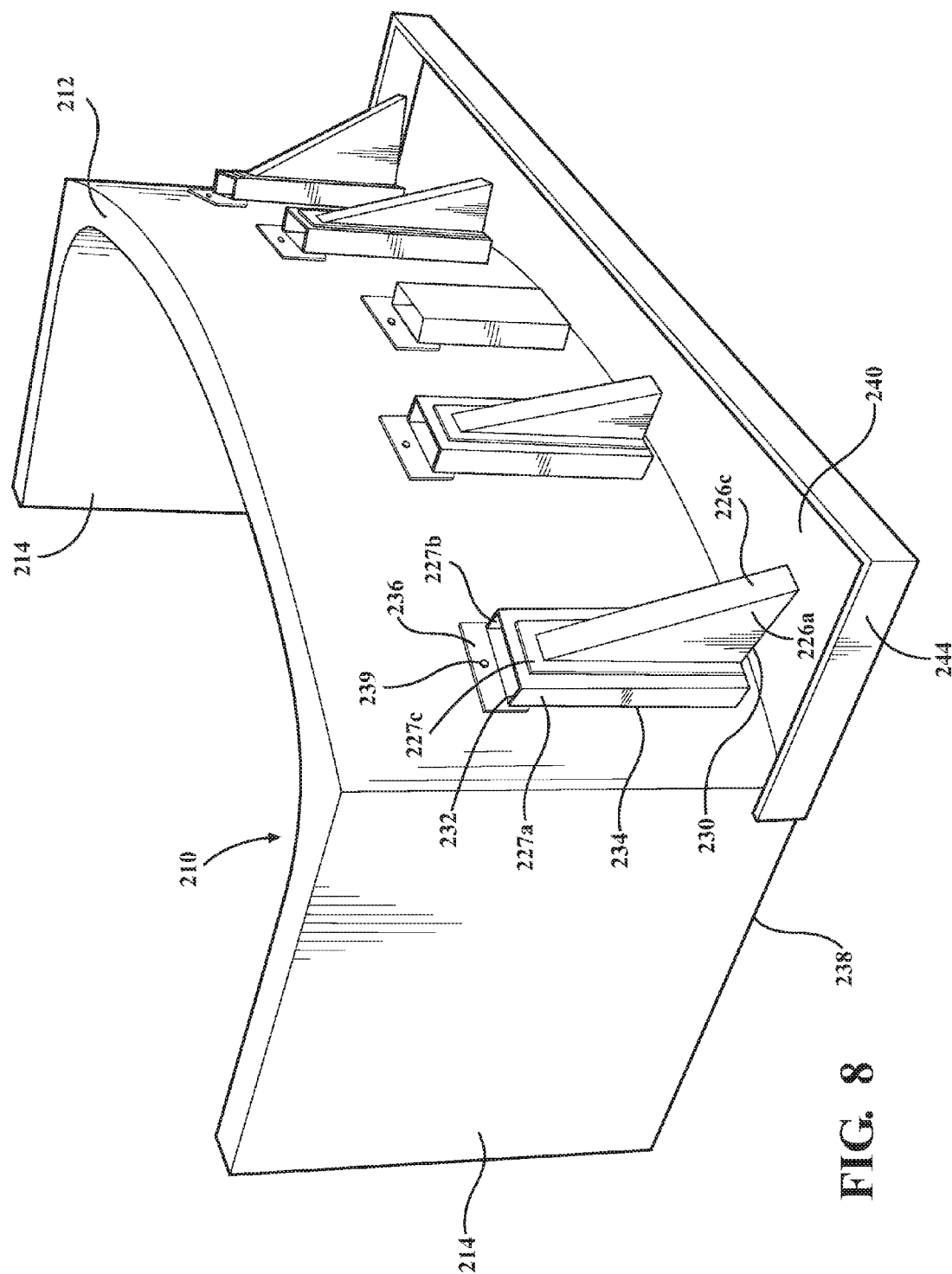
FIG. 8 is a perspective view of the bridge unit and framing unit including releasably attached earth anchor forms illustrating an alternative configuration.
Figure 9:
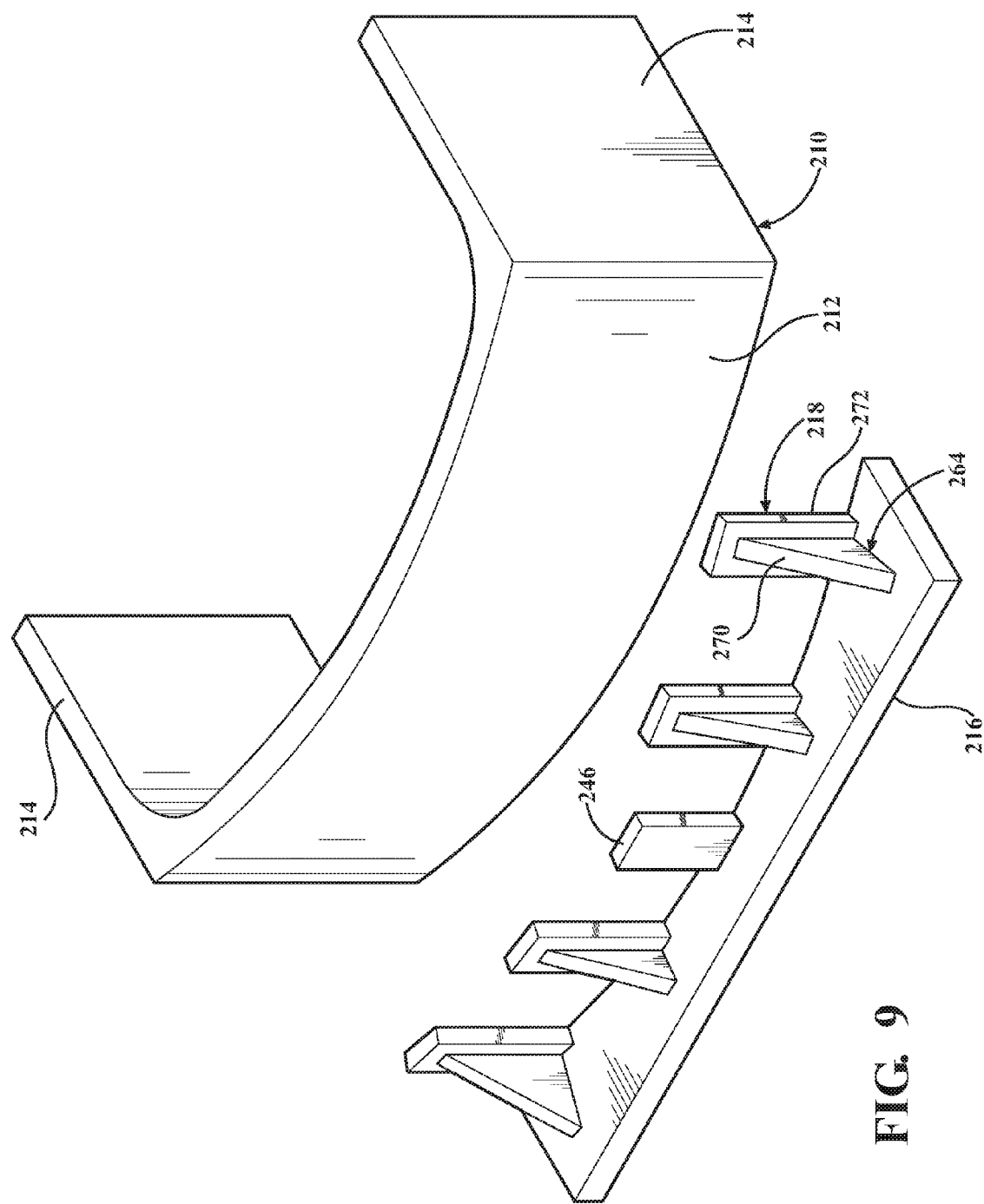
FIG. 9 is a perspective view of a bridge unit and integral unit comprising a headwall and earth anchors following precasting of the integral unit using the earth anchor forms of FIG. 8.
Figure 10:
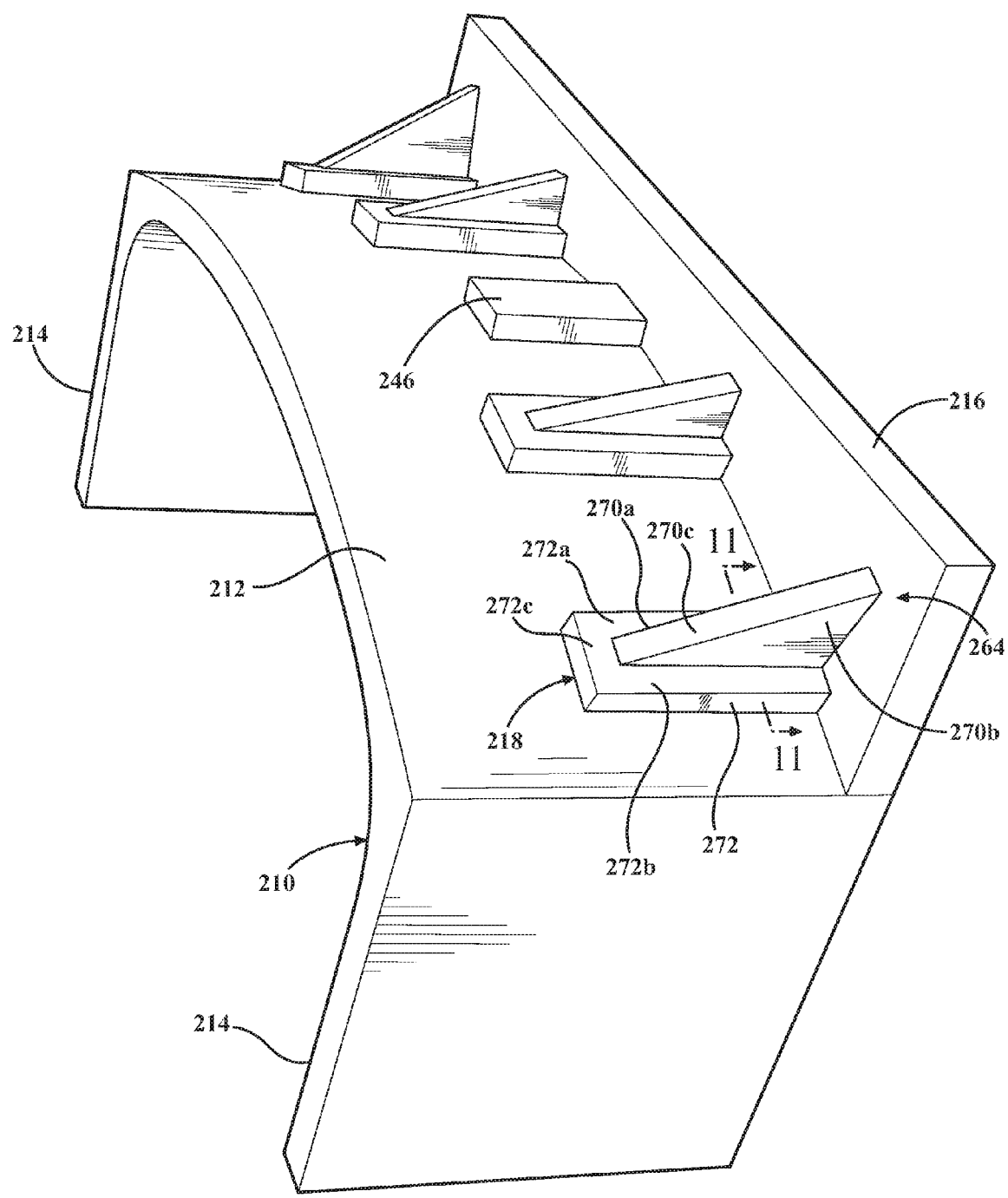
FIG. 10 is a perspective view of the bridge unit and headwall assembly formed using the bridge unit and integral unit of FIG. 9.

FIGS. 8-11 illustrate a further alternative configuration of the bridge unit and headwall assembly. Referring initially to FIGS. 8 and 10, a precast reinforced concrete culvert or bridge unit 210 is constructed. The bridge unit 210 includes a top wall 212, which may have a conventional arcuate construction, as illustrated in FIGS. 8 and 10, or which may have a flat construction, and which integrally connects parallel spaced vertical side walls 214 to form a bridge unit. A separately precast steel reinforced flat concrete headwall 216 (FIG. 10) projects upward from one end of the bridge unit 210 and is supported by a plurality or series of laterally spaced concrete earth anchors 218 that are configured to buttress the headwall 216 in a manner similar to the counterfort members described above. The earth anchors 218 are formed with a counterfort projection or body member 270 and an integrally formed foot member 272 extending around and laterally outward from the body member 270, as is described further below. Additionally, the earth anchors 218 may be of different sizes, as described with reference to the counterfort member of the previous configuration illustrated in FIGS. 5-7. It may be noted that the earth anchors 218 perform a similar function to the previously described counterfort members, but do not include a mechanical connection to the top wall 212 of the bridge unit 210, as is described further below.

Figure 8A:
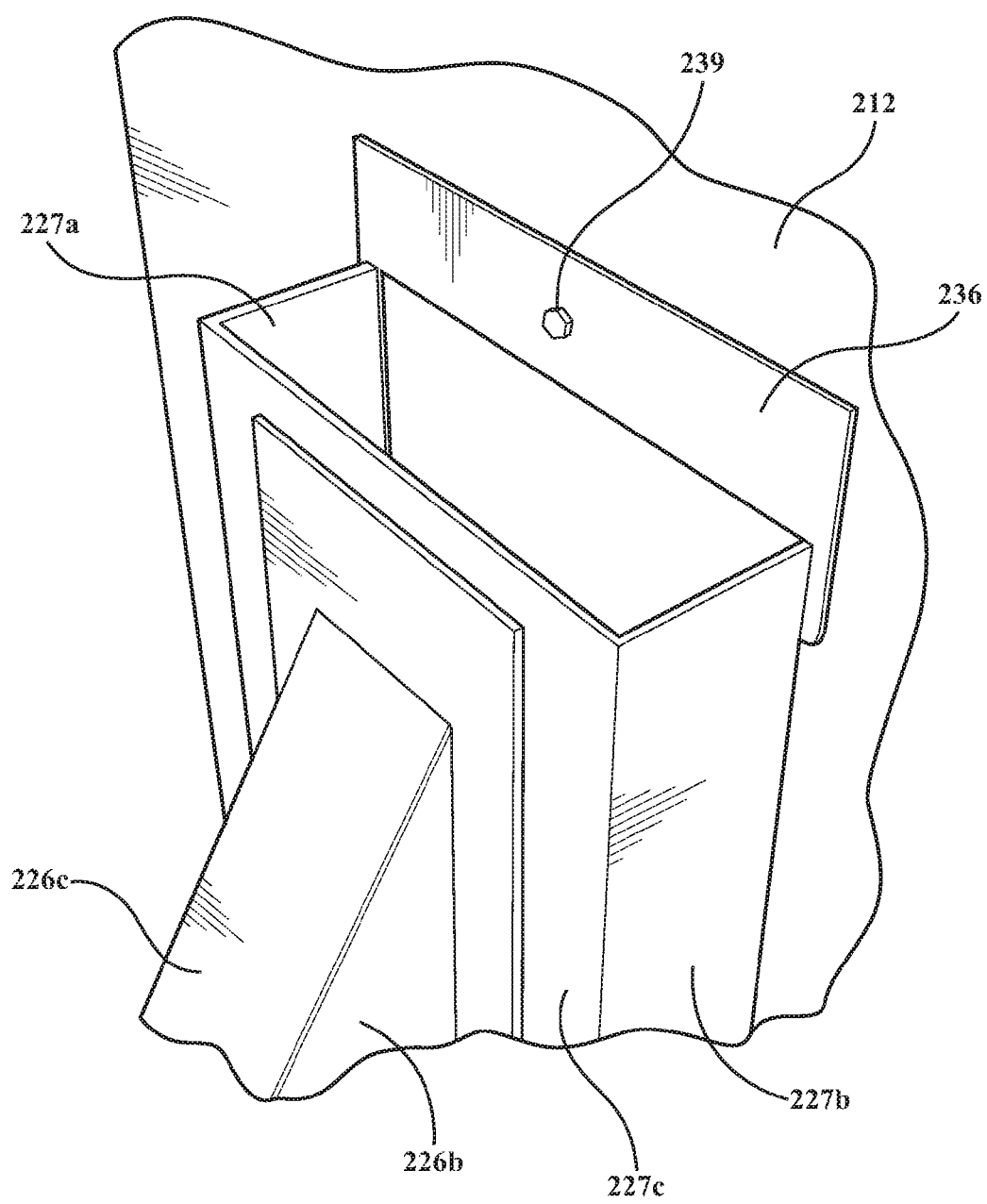
FIG. 8A is an enlarged view of an upper portion of one of the earth anchor forms illustrated in FIG. 8.

Referring to FIG. 8, after the bridge unit 210 is precast, a series of earth anchor forms 224 are releasably attached to the top wall 212 at laterally spaced intervals between the side walls 214. The earth anchor forms 224 include a body mold structure comprising first and second body member side plates 226*a*, 226*b* (see also FIG. 8A) laterally spaced apart and parallel to each other. A lateral plate 226*c* extends between and joins the first and second body member side plates 226*a*, 226*b*. The lateral plate 226*c* is oriented at an angle relative to a plane defined by the headwall 216 and extends outward toward the top wall 212. The earth anchor forms 224 further include a foot mold structure comprising first and second foot member side plates 227*a*, 227*b* laterally spaced apart and parallel to each other. A lateral plate 227*c* extends between and joins the first and second foot member side plates 227*a*, 227*b*, including lateral portions extending between the body member side plates 226*a*, 226*b* and respective foot member side plates 227*a*, 227*b*, and an upper distal portion that is located outward from an end of the body member lateral plate 226c. The body and foot mold structures forming the earth anchor forms 224 define a continuous interior mold area for forming the body member 270 and foot member 227 integral with each other and open at a lower edge 230. The foot member side plates 227a, 227b and lateral plate 227c define a top edge 232 for the earth anchor forms 224, and the foot member side plates 227a, 227b further define a forward edge 234 for the earth anchor forms 224.

Referring to FIG. 8, the bridge unit 210 is initially provided positioned with a first side 238 supported by a horizontal casting surface 240 and the top wall 212 being adjacent a framing unit 244 and associated casting framework (not shown) which may be formed of rebar in a manner similar to the casting framework described for the previous configurations illustrated in FIGS. 1-7. The bottom edge 230 of the earth anchor forms 224 is located adjacent an upper edge of the framing unit 244. The earth anchor forms 224 can be held in place on the top wall 212 by means of a mounting tab 236 extending between the foot member side plates 227a, 227b. The mounting tab 236 may include one or more holes adapted to receive a fastener 239 for temporarily supporting the earth anchor form 224 to the top wall 212. The framing unit 244 is placed on the casting surface 240 to define a top end surface and side edge surfaces of the headwall 216. Further, rebar reinforcements (not shown) may be placed in the respective earth anchor forms 224 such that a portion of the rebar reinforcement extends down into the casting framework, as previously described for the counterfort members.

In accordance with the present configuration, the earth anchors 218 are not formed with a connecting structure for providing a connection to the top wall 212. In particular, the earth anchors 218 are formed without passages for accommodating fasteners defining connection points to the top wall 212, and it is not necessary to provide the top wall with connection structure, e.g., embedded anchor members, for assembly of the headwall 216 to the top wall 212, as will be described further below.

The concrete headwall 216 is cast on the casting surface 240 embedding the casting framework within the headwall 216. Before the headwall 216 completely hardens, the earth anchors 218 are cast into the earth anchor forms 224, in a manner similar to that described above with reference to the formation of the counterfort members 18 and 118. In particular, the earth anchors 218 may be precast simultaneous with the precasting of the headwall 216, where "simultaneous", as used herein, encompasses precasting the earth anchors 218 at the same time as precasting of the headwall 216, as well as shortly after an initial setting of the concrete forming the headwall 216. That is, it may be desirable to allow an initial firming of the material forming the headwall 216 prior to precasting of the earth anchors 218 in order to provide a supporting layer of material under the earth anchor forms 224, prior to complete curing of the concrete forming the headwall 216. In any construction involving the simultaneous formation of the earth anchors 218 with the headwall 216 it should be understood that the material of the earth anchors 218 is formed continuous or integral with the material of the headwall 216 to form a seamless structure including the headwall 216 and earth anchors 218 and defining an integral unit 264 (FIG. 9). Subsequent to complete hardening of the material of the integral unit 264, the series of earth anchor forms 224 is removed from the top wall 212 of the bridge unit 210. The integral unit 264 is then separated from the bridge unit 210 for shipment to a construction site where the integral unit 264 and bridge unit 210 may be assembled to form a bridge unit and headwall assembly.

Referring to FIG. 10, the body member 270 of the earth anchor 218 defines a buttress that extends outward from the headwall 216, and includes an outer lateral surface 270c extending between planar opposing lateral sides 270a, 270b. The outer lateral surface 270c extends at a downward angle from the headwall 216 toward the top wall 212. The foot member 272 defines a base that extends around a lower perimeter portion of the body member 270. The foot member 272 includes lateral foot sections 272a, 272b that extend laterally outward from the lateral sides 270a, 270b of the body member 270, and a distal foot section 272c defining a surface that extends from the body member 270 distal from the headwall 216 and forming a connecting surface between the lateral foot sections 272a, 272b. The foot member 272 extends a substantial distance out from the body member 270 and preferably extends a distance, in each lateral direction and in the distal direction, at least equal to the lateral width of the body member 270.

Figure 11:
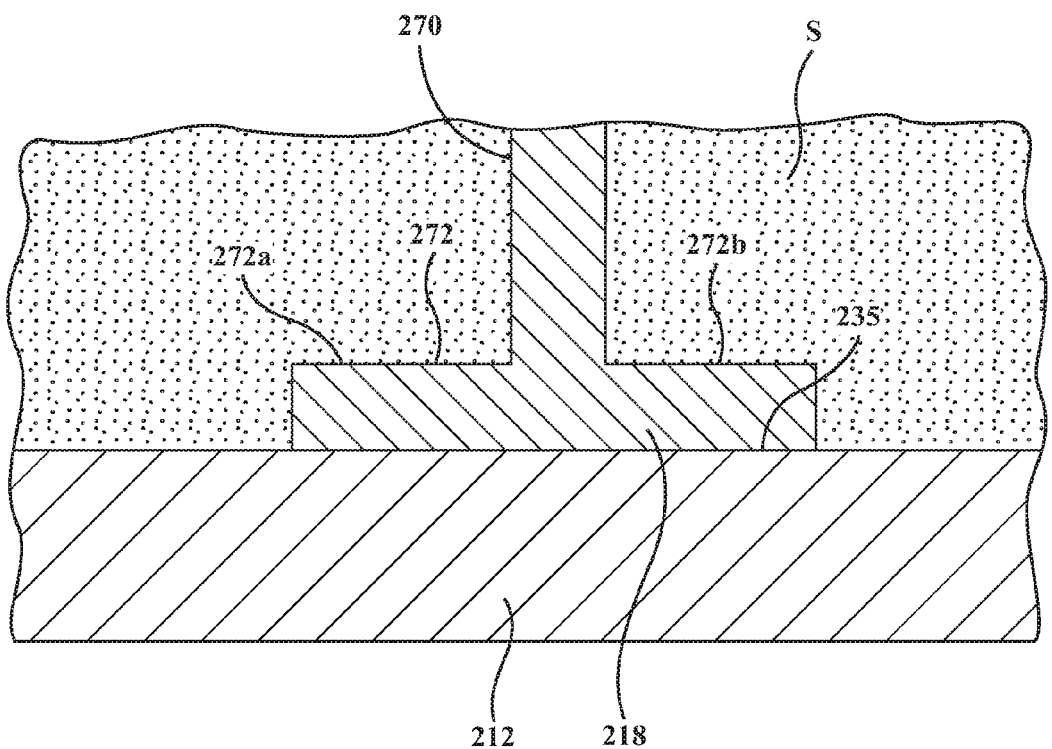
FIG. 11 is a cross-sectional elevation view taken along line 11-11 in FIG. 10 through an earth anchor and an adjacent portion of the top wall.

As is further seen in FIG. 11, the body member 270 and foot member 272 each comprise a planar body wherein the body member 270 is oriented perpendicular to the foot member 272, defining an earth anchor cross-section having an inverted T-shape. The earth anchors 218 are positioned in contact with the top wall 212 and effect or form a frictional engagement at an interface 235 between the earth anchors 218 and the top wall 212. The interface 235 is formed without a connecting structure, e.g., without bolts or other linking structure, extending across the interface 235 between the earth anchors 218 and the top wall 210. Frictional forces between the earth anchors 218 and the top wall 212 resist horizontal movement of the headwall 216 relative to the bridge unit 210. In particular, the foot member 272 of the earth anchors 218 has an upper surface that is generally parallel to the top wall 212 and that provides a substantial surface for supporting soil S that is layered as a covering over both the top wall 212 and the earth anchors 218, wherein the weight of the soil S on the foot member 272 increases the frictional forces at the interface 235 to retain the headwall 216 in its horizontal position on the top wall 212. The layer of soil S on the foot member 272 also operates to weight the earth anchors 218 to retain the headwall in its vertical position, resisting tipping or pivoting of the headwall 216 about its lower edge. The present configuration for the earth anchors 218 can enable a more efficient construction for the bridge unit and headwall assembly in that it permits the bridge unit 210 and headwall 216 to be constructed without placement of anchor members and aligned connecting passages with associated fasteners extending between earth anchors and the top wall.

In addition to the above described earth anchors 218, a low profile earth anchor 246 (see FIGS. 9 and 10) may be provided to facilitate horizontal frictional retention of the headwall 216 relative to the top wall 212. Due to the short height at the central location of the headwall 216, a counterfort projection is not needed and only a frictional foot member defined by the earth anchor 246 may be provided. The frictional foot member defined by the earth anchor 246 may be configured as a rectangular member centrally located along the headwall 216, without a body member, such that a large upper surface is presented for receiving the weight of the soil S and for presenting a substantial frictional engagement surface to the top wall 210.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A precast concrete bridge and headwall assembly comprising:
   a precast concrete bridge unit including a top wall extending in a lateral direction between and connecting opposite side walls; and
   a precast concrete headwall having a bottom surface engaged on the top wall of the bridge unit and a series of earth anchors at laterally spaced intervals between the side walls, each earth anchor comprising:
   a) a body member extending outward from the headwall to the top wall and having opposing lateral sides; and
   b) a foot member extending laterally outward from either lateral side of the body member engaged on the top wall and including an upper surface generally parallel to the top wall.

2. The assembly of claim 1, wherein the earth anchors are positioned in contact with the top wall to effect a frictional engagement at an interface between each earth anchor and the top wall.

3. The assembly of claim 2, wherein the interface formed between each earth anchor and the top wall is formed without a connecting structure extending across the interface between the earth anchors and the top wall.

4. The assembly of claim 1, wherein the opposing lateral sides of the body member comprise opposing planar surfaces and the foot member includes lateral foot sections that extend laterally outward from each of the lateral sides of the body member.

5. The assembly of claim 4, wherein the foot member includes a distal foot section defining a surface that extends from the body member, distal from the headwall, and between the lateral foot sections.

6. The assembly of claim 5, including a layer of soil covering the foot member to effect a weight on the earth anchor retaining the headwall in a vertical position on the top wall.

7. The assembly of claim 1, wherein the body member is defined by a planar member and the foot member is defined by a planar member, the body member extending perpendicular to the foot member.

8. The assembly of claim 1, wherein the earth anchors are integrally formed with the headwall such that no seam is present between the headwall and the earth anchors.

9. A precast concrete bridge and headwall assembly comprising:
   a precast concrete bridge unit including a top wall extending in a lateral direction between and connecting opposite side walls; and
   a precast concrete headwall having a bottom surface engaged on the top wall of the bridge unit and a series of earth anchors at laterally spaced intervals between the side walls, each earth anchor comprising:
   a) a body member extending outward from the headwall to the top wall and having opposing lateral sides; and
   b) a foot member extending laterally outward from either lateral side of the body member engaged on the top wall and including an upper surface generally parallel to the top wall; and
   wherein the earth anchors are integrally formed with the headwall such that no seam is present between the headwall and the earth anchors.

10. The assembly of claim 9, wherein the body member is defined by a planar member and the foot member is defined by a planar member, the body member extending perpendicular to the foot member.

11. The assembly of claim 10, wherein the foot member includes a distal foot section defining a surface that extends from the body member, distal from the headwall, and between the lateral foot sections.

12. The assembly of claim 9, wherein the earth anchor defines a cross-section having an inverted T-shape.

* * * * *